United States Patent
Branston

(10) Patent No.: US 7,246,577 B2
(45) Date of Patent: Jul. 24, 2007

(54) RECIPROCATING PISTON ENGINES

(76) Inventor: Julian George Daniel Branston, 21 Carlton Road, Boston, Lincolnshire (GB) PE21 8NS ( * ) Notice: Subject to any disclaimer, the term of this patent is extended or adjusted under 35 U.S.C. 154(b) by 14 days.

(21) Appl. No.: 10/523,190

(22) PCT Filed: Jul. 30, 2003

(86) PCT No.: PCT/GB03/03311

§ 371 (c)(1),
(2), (4) Date: Sep. 23, 2005

(87) PCT Pub. No.: WO2004/011786

PCT Pub. Date: Feb. 5, 2004

(65) Prior Publication Data

US 2006/0118070 A1    Jun. 8, 2006

(51) Int. Cl.
*F02B 25/14*    (2006.01)
*F02B 33/32*    (2006.01)

(52) U.S. Cl. .................. 123/73 AF; 123/65 V
(58) Field of Classification Search .......... 123/65 V, 123/73 AF, 65 PE, 73 AV, 65 P
See application file for complete search history.

(56) References Cited

U.S. PATENT DOCUMENTS 4,191,141 A    3/1980  Franke
5,267,535 A  * 12/1993  Luo ................. 123/65 PE
5,403,164 A    4/1995  Gama

FOREIGN PATENT DOCUMENTS

DE    31 31 805 A    3/1983

OTHER PUBLICATIONS

International Search Report for PCT Application No. PCT/GB2003/003311; Filed Jul. 30, 2003; Date of Completion Dec. 10, 2003; Date of Mailing Dec. 17, 2003.

* cited by examiner

*Primary Examiner*—Stephen K. Cronin
*Assistant Examiner*—Hyder Ali
(74) *Attorney, Agent, or Firm*—Alston & Bird LLP

(57) ABSTRACT

A reciprocating piston engine has a cylinder with a transfer port and an exhaust port, wherein the transfer port and exhaust port are at least partially coincident and are provided with a port valve. The engine includes a pump having a divided chamber therein, one side of the chamber being connected to a crankcase via a connecting port, and the other side of the chamber having an inlet port, an outlet port, and a valve to ensure unidirectional flow therethrough. The chamber is divided by a moving member responsive to variations in pressure in the crankcase to cause flow through the other side of the chamber.

9 Claims, 4 Drawing Sheets

RECIPROCATING PISTON ENGINES

BACKGROUND OF THE INVENTION

The present invention relates to an engine and in particular, although not exclusively, to a two-stroke reciprocating piston engine.

It is known to provide a crankcase-scavenged two-stroke engine comprising a piston which reciprocates in a cylinder, the cylinder having transfer ports from the crankcase to the cylinder, and an exhaust port. The top of the exhaust port is located higher up the cylinder than the transfer ports, so as to permit most of the combustion gases to escape before a new charge enters the cylinder via the transfer ports. In other words the exhaust port is uncovered by a descending piston before the transfer ports. A subsequent charge enters the crankcase on the upstroke of the piston, and is pushed into the cylinder when the transfer ports reopen on the next down stroke of the piston.

Several problems are associated with the prior art crankcase-scavenged two-stroke engines. The requirement for the transfer ports to be in the swept stroke represents an inefficiency of the induction cycle since little or no work can be obtained from the piston displacement when the transfer ports are open.

It is well known that fresh charge can pass directly to exhaust, and it has been proposed to provide a tuned exhaust in an attempt to push the escaped charge back into the cylinder by the use of pressure pulses but this can result in an engine with a narrow power band.

The exhaust and transfer port design of prior art two-stroke engines is typically a compromise which may reduce the theoretical maximum power output from the engine and may also contribute to increased emissions from the engine.

These problems are all well known, and numerous solutions have been proposed to improve engine efficiency, to reduce contamination of the charge due to crankcase lubricant and to reduce pollution due to unburned fuel leaving the exhaust port.

What is required is an improved engine which can overcome the aforementioned problems, and maximise the opportunity for charge pumping and charge compression, and reduce transfer losses in a simple and cost effective manner.

SUMMARY OF THE INVENTION

According to the invention there is provided a two-stroke engine having a cylinder with a transfer port and an exhaust port, whereby the transfer port and the exhaust port are at least partially coincident, the transfer port and the exhaust port being further provided with a port valve, operable between a position to substantially close the transfer port and open the exhaust port during an exhaust phase of the engine, and a position to substantially open the transfer port and close the exhaust port during a transfer phase of the engine.

In this arrangement the fresh charge is substantially prevented from exiting the cylinder through the exhaust port. Furthermore this arrangement allows the transfer port to remain open for longer when compared to prior engines since the transfer port opens into the exhaust port, and thus remains open until the top of the exhaust port is closed by a piston of the engine. This allows an increased volumetric charge to the combustion chamber to provide an increase in the power output from the engine. Correspondingly the engine may have improved overall engine efficiency.

In one embodiment the valve may further comprise a deflector to deflect an incoming charge radially inward to the cylinder.

An engine so arranged has an improved swirl of the charge introduced into the cylinder when compared to the prior engines since the fresh charge introduced into the cylinder enters the cylinder radially inward and away from the exhaust port.

In one embodiment the deflector is arranged to deflect the incoming charge to one side of the centre and towards the top of the cylinder. This has the effect of producing an upward helical swirl of the charge.

In one embodiment the engine is further provided with a fuel injector to ensure an accurate fuel/air ratio over a wide range of operating conditions. In this embodiment the transfer port is arranged to input fresh air to the cylinder from either a crankcase of the engine or from a separate air pump. The transfer port may be in fluid communication with a turbo charger or supercharger to provide additional boost.

Preferably a low friction port valve is used to reduce parasitic losses to a minimum. In the preferred embodiment the port valve comprises a rotary valve which may be operable by an electric motor, typically in conjunction with a conventional engine management system. Alternatively the port valve can be operated from a direct drive of the engine such as from a flywheel having a cam profile thereon adapted to operate the valve.

In yet a further alternative the port valve is resiliently biased, by for example a suitable spring, whereby the port valve is arranged to be opened by transfer gases from the engine, in use.

In another embodiment the transfer port is provided with a transfer tract with a transfer valve such as a reed valve to ensure unidirectional flow of gaseous fluid through the transfer port. This arrangement prevents combustion gases entering the transfer tract, and thus ensure that a fresh charge is not contaminated.

An arrangement of the port valve and transfer valve so described permits the full stroke of the piston to be utilised to compress the charge since no charge escapes from the combustion chamber via the exhaust port or the transfer port during charge compression.

It will be appreciated that the port valve and the transfer valve can be adjusted to have variable timing depending on the rotational speed of the engine, the position of the piston within the cylinder and the power or torque demand. The valves may also be adapted to be partially or progressively opened or closed. Such variable timing enables tuning of the engine for optimisation of the power output or the fuel efficiency, or for controlling emissions from the engine. The advantage of such progressive valve timing is that an incoming charge from the transfer port can be used to create a swirl to push the combustion gases from the cylinder after combustion of a previous charge.

In the preferred embodiment the invention is adapted for a single cylinder engine. However a multi-cylinder engine may also benefit from the invention provided that the exhaust port and transfer port of each cylinder is provided with a port valve, one for each piston/connecting rod assembly.

In an alternative arrangement there is provided a two-stroke engine having a cylinder with a transfer port and an exhaust port, the exhaust port being further provided with a port valve operable between a position to substantially open the exhaust port during an exhaust phase of the engine, and a position to substantially close the exhaust port during a transfer phase of the engine.

In this arrangement the transfer port and the exhaust port are not required to be coincident and conventional transfer ports can be used to transfer a fresh charge into the cylinder.

The invention also provides a reciprocating piston engine assembly including a cylinder with an inlet and an exhaust, a crankcase, a crank a connecting rod and a piston, the crankcase comprising a closed chamber having a connecting port in a wall thereof, and the assembly further comprising a pump having a divided chamber therein, one side of said chamber being connected to said crankcase via said connecting port, and the other side of said chamber having an inlet port, an outlet port, and valve means to ensure unidirectional flow therethrough, wherein said chamber is divided by a moving member responsive to variations in pressure in said crankcase to cause flow through said other side of said chamber.

The rise and fall in crankcase pressure is an inevitable result of piston reciprocation, and the effect in the pump is to cause movement of the moving member, with consequent cyclical variation of the volume of said other side. The valve means ensure that unidirectional flow is a result, and consequently the pump can be arranged to provide a supply of fresh clean air to the inlet tract of the engine. It will be appreciated that the moving member is a barrier to crankcase oil mist.

It will be appreciated that the usual transfer passages to the crankcase are eliminated so that the full displacement of the piston is used to generate a cyclical pressure variation in the crankcase, which can be transferred to the pump.

In addition, an engine so arranged reduces the unpowered displacement of the piston stroke, due to the transfer port being open in the prior at design, which may provide an increase in the power output from the engine. Correspondingly the engine may have improved overall engine efficiency.

In a multi-cylinder engine, the crankcase is divided into substantially sealed chambers, one for each piston/connecting rod assembly.

In the preferred embodiment the pump provides clean air under pressure to the engine. A fan may be included upstream of the pump inlet port in order to increase inlet pressure, and thereby outlet pressure. Sophisticated valving is of course possible, including variable valve timing, and such an arrangement is particularly effective in scavenging of a two-stroke engine. In conjunction with an air inlet valve, the engine preferably uses fuel injection to ensure an accurate fuel/air ratio over a wide range of operating conditions.

Air under pressure from the pump may also be mixed with fuel upstream of the engine, for example in a carburettor or indirect injection system.

In a further refinement of a two-stroke engine, air from the pump may be introduced into the exhaust as a pulse to both urge burnt gases down the exhaust tract, and to prevent a fresh fuel/air charge from passing to exhaust before combustion, thereby mirroring the characteristics of prior exhaust expansion chambers.

Preferably the pump has a first plenum chamber downstream thereof. This allows the fluid to be supplied for example to the exhaust or the combustion chamber on demand and without pressure pulsing due to the cyclical nature of pump operation.

In the alternative embodiment pressure pulsing of the pump may be used to advantage in a tuned inlet tract, so as to maximise the volume of air admitted to the cylinder on each suction stroke.

The pump may be arranged separately from, immediately adjacent or integrated in the crankcase. The separate location of the pump from the engine has the advantage that a cooler and thereby denser charge is provided to the cylinder than prior engines using a convention transfer port design. Any kind of moving member is possible, but preferably a low friction member is preferred so as to reduce parasitic losses to a minimum. In the preferred embodiment the moving member comprises a bellows, the capacity of said bellows being substantially equal to the swept volume of the piston. In an alternative arrangement the moving member is a diaphragm.

Advantageously the inlet port of the pump is in fluid communication with an air box, the air box being open to atmosphere. In an alternative embodiment the inlet port has a venturi with a fuel supply to provide a charge for the combustion chamber.

A fan may be included upstream of the pump inlet port in order to increase inlet pressure, and thereby outlet pressure.

In accordance with another embodiment there is provided a second plenum chamber downstream of said first plenum chamber. The second plenum chamber operating at a higher pressure to introduce clean air into the inlet or exhaust at a higher pressure than the first plenum chamber.

The engine assembly may further include a second pump, said second pump having an inlet connected to an air box upstream thereof, and an outlet connected to the inlet of said first plenum chamber. The second pump may be an engine driven pump.

In accordance with another aspect there is provided a reciprocating piston engine assembly having a flywheel, wherein the flywheel includes a cam profile thereon adapted to operate a reciprocating pump. Such a pump may be used to supply clean air under pressure, for example to the first or second plenum chamber.

The combination of the port valve and the pump is particularly advantageous, and promises an engine which has an increased power output and reduced harmful emissions when compared to prior engines. The addition of the transfer valve to this combination may further improve power output, reduce harmful emissions and improve overall engine efficiency.

BRIEF DESCRIPTION OF THE DRAWING

Other features of the invention will be apparent from the following description of a preferred embodiment shown by way of example only in the accompanying drawing, in which.

DETAILED DESCRIPTION OF PREFERRED EMBODIMENTS

Figure 1:
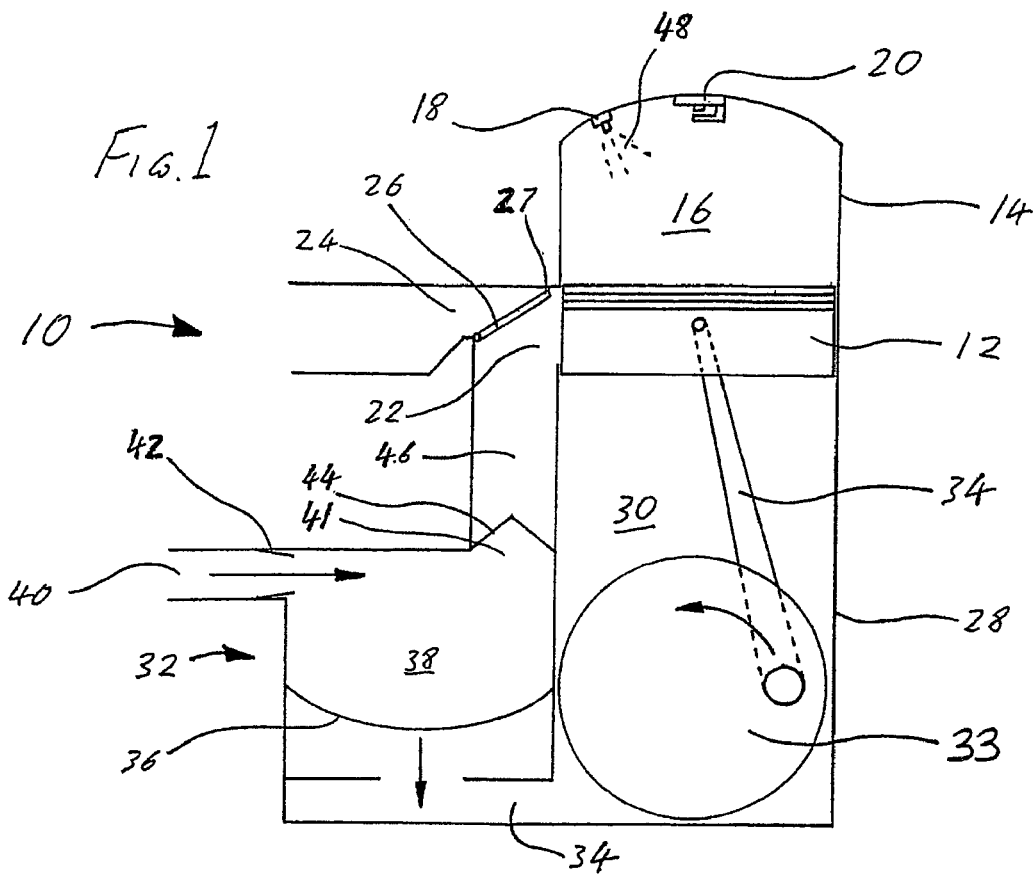
FIG. 1 is a schematic representation of an engine according to the present invention prior to charge ignition.
Figure 2:
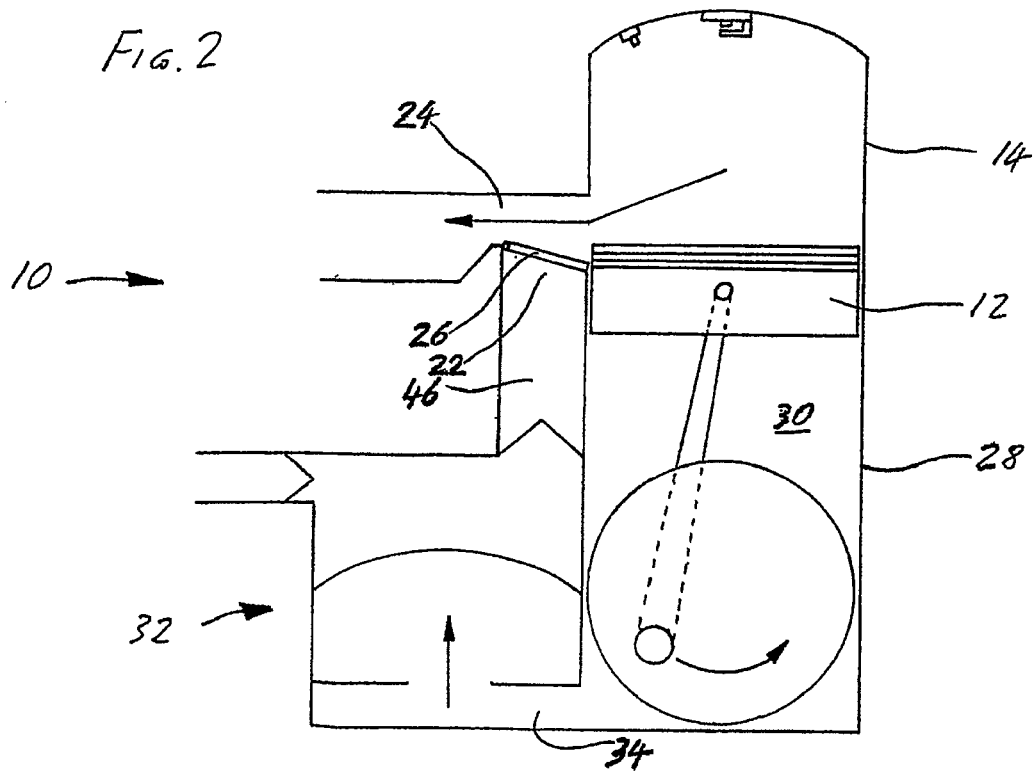
FIG. 2 is a schematic representation of the engine of FIG. 1 undergoing exhaust.
Figure 3:
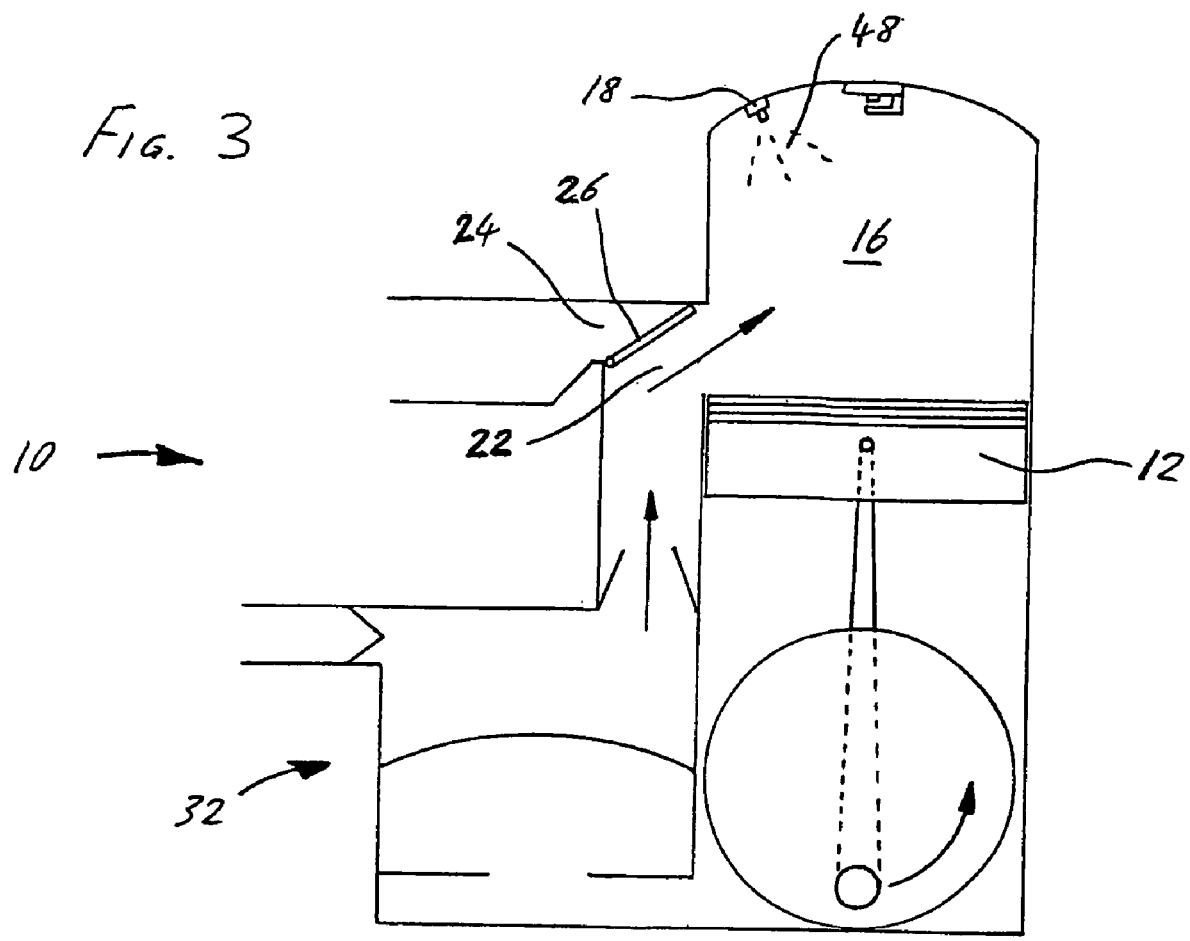
FIG. 3 is a schematic representation of the engine of FIG. 1 undergoing charge transfer.

FIGS. 1 to 3 illustrate an engine according to the present invention, generally designated 10, completing one cycle. Like features are shown with like reference numerals. FIG. 1 shows the engine 10 prior to a charge 48 being ignited. FIG. 2 shows the engine 10 undergoing exhaust. FIG. 3 shows the engine 10 undergoing charge transfer.

In FIG. 1 a piston 12 is shown which reciprocates in a cylinder 14. The piston 12 and the cylinder 14 together define a combustion chamber 16. The combustion chamber 16 is provided with a fuel injector 18, a spark plug 20, a transfer port 22 and an exhaust port 24. The transfer port 22 is coincident with the exhaust port 24 and has a valve 26 to permit either the exhaust port 24 or the transfer port 22 to be open to the chamber 16. The valve 26 has a free edge 27 that is movable between the top of the exhaust port 24 and the bottom of the transfer port 22. The valve 26 can be operated by any suitable means, such as an electric motor, and may comprise a rotary valve.

The engine 10 of further comprises a crankcase 28 which defines a crankcase chamber 30. The crankcase 28 houses a crank 33, the crank 33 being connected via a connecting rod 34 to the piston 12. The crankcase chamber 30 is in fluid communication with a pump 32 via a connecting port 34. The pump 32 has a membrane 36 that reciprocates in a pump chamber 38. The pump 32 has an inlet 40 and an outlet 41. The inlet 40 is in fluid communication with an air box (not shown) having an air filter (not shown). The air box is open to atmosphere to provide a supply of clean and fresh air to the pump 32. Each of the inlet 40 and the outlet 41 are provided with a one-way valve 42, 44, such as a reed valve to permit unidirectional flow of fresh air through the pump. The outlet 41 is in fluid communication with the transfer port 22 via a transfer passage 46.

As the piston 12 reciprocates in the cylinder 14 the pressure within the crankcase chamber 30 varies in a cyclic manner. This cyclic pressure change causes the membrane 36 to reciprocate within the pump chamber 38. The one way valves 42,44 of the pump 32 allow the pump 32 to pump fresh air in response to the varying pressure within the crankcase chamber 30. The membrane 36 acts to separate the volume of gas in the crankcase chamber 30 from the fresh air being pumped by the pump 32. This allows the oil contaminated gases within the chamber 30 to be separated from the fresh air being pumped by the pump 32.

In FIG. 1 the fuel injector 18 is shown injecting a fuel charge 48 into the chamber 16. The charge 48 can be injected at any time after exhaust and between when the piston 12 is at bottom dead centre and before the piston 12 reaches top dead centre in accordance with known techniques. In the Figure the piston 12 is shown as the top of the exhaust port 24 is closed by the piston 12 moving up the cylinder 14 to compress the charge 48. The valve 26 is shown in the position whereby the exhaust port 24 is closed. The inlet valve 42 is shown in the open position as fresh air is input to the chamber 38 due to the piston 12 moving up the cylinder 14.

Referring now to FIG. 2 the piston 12 is shown travelling down the cylinder 14 after ignition of the combustion gases and just after it has uncovered the exhaust 24 so that the exhaust gases pass into the exhaust 24. The valve 26 is shown in the position whereby the exhaust port 24 is open and the transfer port 22 is closed. The exhaust gases are prevented from passing into the transfer passage 46 by the valve 26. The pressure in the crankcase 28 due to the position 12 travelling down the cylinder 14 causes air within the crankcase chamber 30 to pass into the pump 32 via the connecting port 34.

In FIG. 3 the engine 10 is shown undergoing charge transfer. The valve 26 is shown in position to close the exhaust 24 so that the transfer port 22 is open. The valve 26 also acts as a deflector so that fresh air from the pump 32 is deflected radially inward to the combustion chamber 16 to provide an advantageous swirl and mixing with the charge 48 from the injector 18. The fresh air is directed radially inward to the centre of the piston 12 in an opposite direction to the exhaust gases illustrated in FIG. 2. No charge 48 or fresh air escapes via the exhaust port 24 during charge compression since the exhaust port 24 remains closed by the valve 26. The piston crown may be shaped according to known techniques to induce a desired swirl motion.

It will be appreciated that the valve 26 can be adjusted to have variable timing depending on the rotational speed of the engine or the position of the piston 12. Such variable timing permitting tuning of the engine 10 for optimisation of the power output or the fuel efficiency, or for controlling harmful emissions from the engine.

The injector 18 of FIGS. 1-3 may alternatively be omitted and the inlet port 40 connected to an indirect fuel injection system or a carburettor in order to pump a fuel/air mixture. Furthermore the air or fuel/air mixture may also be thermally insulated from the engine to provide a cooler and, therefore, denser charge.

An engine so described in FIG. 1-3 allows the transfer port 22 to remain open for longer when compared to the prior art engine, which may provide an increase in the power output from the engine. Correspondingly the engine may have improved overall engine efficiency, power output and petrol consumption combined with a reduction in harmful exhaust emissions. An engine so constructed may also be cheaper to manufacture since the complexity of the cylinder casting and internal transfer ports is reduced when compared to a prior two-stroke engine. Correspondingly the tooling to manufacture the cylinder 14 is cheaper.

In an alternative embodiment the exhaust port and the transfer port are not coincident and the port valve is operable to substantially open and close the exhaust port only. In this arrangement transfer tracts and ports of a conventional kind are used to transfer a fresh charge to the cylinder. The transfer tracts may be provided with one way valves such as reed valves to ensure unidirectional flow therethrough.

Figure 4:
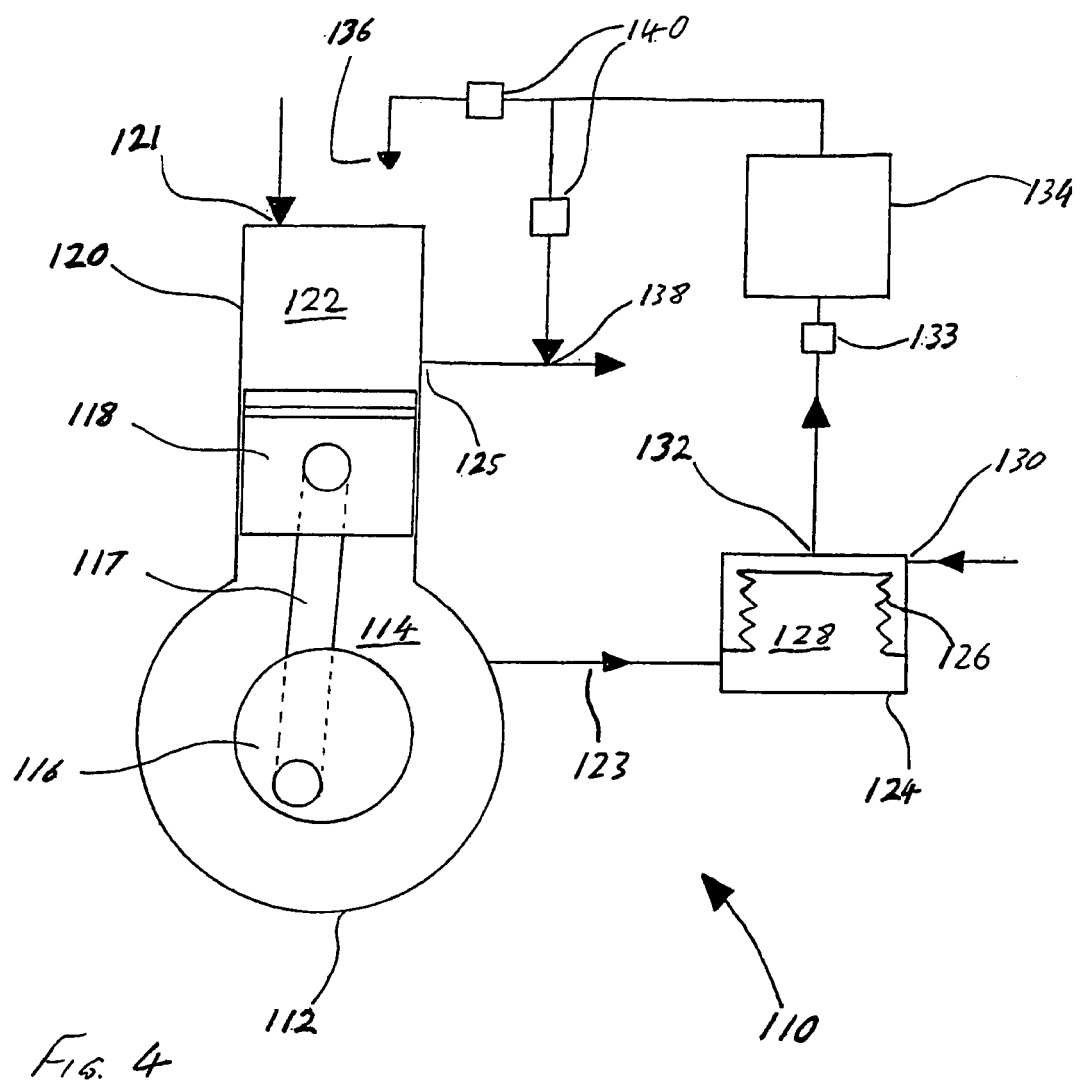
FIG. 4 is a schematic representation of an engine according to another embodiment of the present invention.

FIG. 4 shows a schematic representation of a two-stroke engine designated 110. The engine 110 comprises a crankcase 112 which defines a crankcase chamber 114. The crankcase 112 houses a crank 116, the crank 116 being connected via a connecting rod 117 to a piston 118 which reciprocates in a cylinder 120. The piston 118 and the cylinder 120 together define a combustion chamber 122. The combustion chamber 122 has a fuel inlet 121, a fresh air supply 136 and an exhaust 125.

The crankcase chamber 114 is in fluid communication with a pump 124 via a fluid connection 123. The pump 124 has a membrane 126 that reciprocates in a pump chamber 128. The pump 124 has an inlet 130 and an outlet 132. The inlet 130 is in fluid communication with an air box (not shown) having an air filter (not shown). The air box is open to atmosphere to provide a supply of clean and fresh air to the pump 124. Each of the inlet 130 and the outlet 132 has a one way valve (not shown) such as a reed valve. The outlet 132 from the pump 124 is in fluid communication with a plenum chamber, or pressure reservoir, 134. An electronic control valve 133 may also be provided between the pump 124 and the pressure reservoir 134. The pressure reservoir 134 is in fluid communication with an inlet 136 to the combustion chamber 122 and optionally an inlet 138 to the exhaust 125. The inlet 136 to the combustion chamber 122 and the inlet to the exhaust 125 may also be provided with electronic control valves 140 to regulate the flow of fresh air according to the timing of the engine, and the inlet 136 may connect to inlet tract 22 of the embodiment of FIGS. 1-3, so as to replace the transfer passage 46.

As the piston 118 reciprocates in the cylinder 120 the pressure within the crankcase chamber 114 varies in a cyclic manner. This cyclic pressure change causes the membrane 126 to reciprocate within the pump chamber 128. The one way valves 130,132 of the pump 124 allow the pump 124 to pump fresh air in response to the varying pressure within the crankcase chamber 114. The membrane 126 acts to separate the volume of gas in the crankcase chamber 114 from the fresh air being pumped by the pump 124. This allows the oil contaminated gasses within the chamber 114 to be separated from the fresh air being pumped by the pump 124. The pressure reservoir 134 acts as a source of pressurized fresh air which is supplied to the inlet 136 and optionally to the inlet 138 to the exhaust 125.

Figure 5:
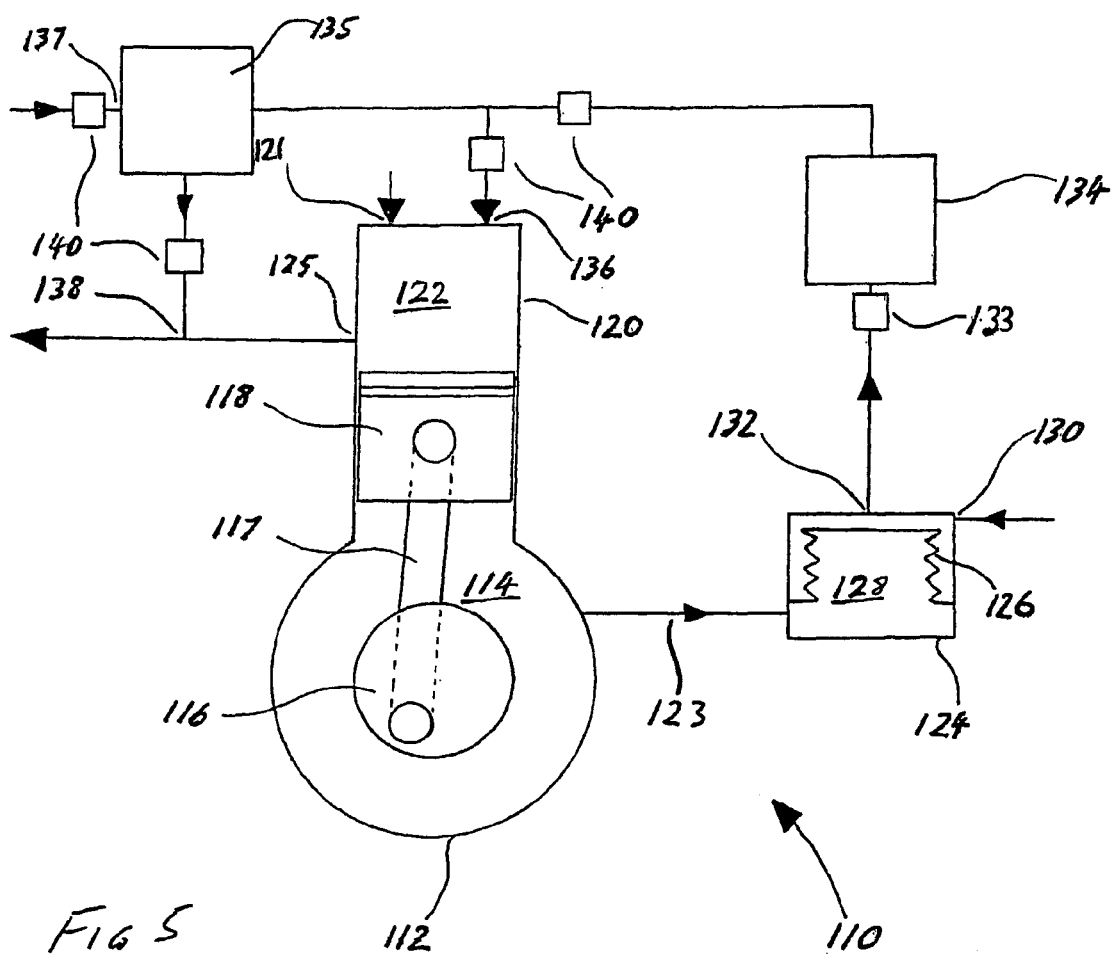
FIG. 5 is a schematic representation of an engine according to yet another embodiment of the present invention.

Another embodiment of the present invention is presented in FIG. 5. Features common to the embodiment of FIG. 4 are shown with like reference numerals. In this embodiment there is provided a second plenum chamber or pressure reservoir 135 between the pressure reservoir 134 and the inlet 138 to the exhaust 125. The second reservoir 135 may have an additional inlet 137 which is connected to a second pump (not shown), for example an electric pump or an engine driven pump such as a cam driven pump. The additional inlet 137 and the inlet 138 to the exhaust 125 may have electronic control valves 140. The second reservoir 135 is intended to operate at lower volume and higher pressure than the first pressure reservoir 134.

It will be appreciated that the second pump of the embodiment shown in FIG. 5 may be used with the embodiment illustrated in FIG. 4. In this instance the second pump may be used to increase the pressure of the pressure reservoir (134).

The inlet 130 to the pump 124 of FIGS. 4 and 5 may alternatively be connected to an indirect fuel injection system or a carburettor in order to pump a fuel/air mixture. The carburettor or indirect fuel injection may alternatively be located downstream of the pressure reservoir 134 or 135 on either or both of the inlet 136 to the combustion chamber or the inlet 138 to the exhaust.

The control valves 140 of the embodiments illustrated in FIGS. 4 and 5 maintain an optimum pressure within the combustion chamber 122 depending on the engine load or the engine speed. For example, the control valve 140 on the inlet 136 may be used to provide additional combustion gases to the combustion chamber 122 after the exhaust closes and before ignition. The control valve 140 on the exhaust inlet 138 may be used to push unburned combustion gases back into the combustion chamber when the exhaust 125 is open to the combustion chamber 122. The inlets 136,138 may also be aimed or introduced into the combustion chamber more effectively to assist with purging the unburned gasses.

An engine so described herein reduces the unpowered displacement of the piston stroke, due to the transfer ports, which may provide an increase in the power output from the engine. Correspondingly the engine may have improved overall engine efficiency, power output, petrol consumption and exhaust emissions. Furthermore, since there is no engine oil mist introduced into the charge the engine emissions may be reduced when compared to the prior art crankcase-scavenged two-stroke engine. The full displacement of the piston is utilised in the pump 124. Furthermore the air or fuel/air mixture may also be thermally insulated from the engine to provide a cooler and, therefore, denser charge.

An engine assembly so constructed may also be cheaper to manufacture since the required casting of the cylinder 120 and internal transfer ports is reduced. Correspondingly the tooling to manufacture the cylinder 120 is less expensive.

Whilst a preferred embodiment for the device has been described it will be appreciated that many other designs of the engine exist that would have the desired effect of this aspect of the invention with the proviso that the variation in crankcase volume is used to pump atmospheric air into the combustion chamber.

The invention claimed is:

1. A two-stroke engine having a crankcase, a crank, a connecting rod, a piston and a cylinder with a transfer tract, a transfer port through which a fresh fuel/air charge is fed into the cylinder, and an exhaust port, whereby the transfer port and the exhaust port are at least partially coincident, the transfer port and the being further provided with a port valve, operable between a position to substantially close the transfer port and open the exhaust port during an exhaust phase of the engine, and a position to substantially open the transfer port and close the exhaust port during a transfer phase of the engine.

2. An engine according to claim 1, wherein the crankcase comprising a closed chamber with a connecting port in a wall thereof, and the assembly further comprising a pump having a divided chamber therein, one side of said chamber being connected to said crankcase via said connecting port, and the other side of said chamber having an inlet port, an outlet port, and valve means to ensure unidirectional flow therethrough, wherein said chamber is divided by a moving member responsive to variations in pressure in said crankcase to cause flow through said other side of said chamber, said outlet port being in fluid communication with the transfer port of said cylinder.

3. An engine according to claim 2, wherein said pump is connected to a first plenum chamber downstream thereof, said first plenum chamber having an inlet and an outlet.

4. An engine according to claim 3, and further including a second pump, said second pump having an inlet connected to an air box upstream thereof, and an outlet connected to the inlet of said first plenum chamber.

5. An engine according to claim 3, and further including a second plenum chamber downstream of said first plenum chamber, wherein the second plenum chamber operates at a higher pressure than said first plenum chamber.

6. An engine according to claim 5, and further including a second pump, said second pump having an inlet connected to an air box upstream thereof, and an outlet connected to an inlet of said second plenum chamber.

7. An engine according to claim 1, wherein the port valve comprises a rotary valve.

8. An engine according to claim 1, wherein the port valve is resiliently biased whereby the port valve is arranged to be opened by transfer the engine, in use.

9. An engine according to claim 1 wherein the transfer tract has a transfer valve to ensure unidirectional flow of gaseous fluid through the transfer port, in use.

* * * * *

UNITED STATES PATENT AND TRADEMARK OFFICE
CERTIFICATE OF CORRECTION

| | | |
|---|---|---|
| PATENT NO. | : 7,246,577 B2 | Page 1 of 1 |
| APPLICATION NO. | : 10/523190 | |
| DATED | : July 24, 2007 | |
| INVENTOR(S) | : Branston | |

It is certified that error appears in the above-identified patent and that said Letters Patent is hereby corrected as shown below:

Title page,
After (65) Prior Publication Data, insert
 --(30) Foreign Application Priority Data
  July 30, 2002 (UK)  0217655.0
  April 4, 2003  (UK)  0307851.6--.

Column 8,
Line 20, after "transfer port and the" insert --exhaust port--.

Signed and Sealed this

First Day of July, 2008

JON W. DUDAS
*Director of the United States Patent and Trademark Office*